United States Patent [19]

Bühler

[11] 4,075,888
[45] Feb. 28, 1978

[54] MEASUREMENT OF UNDULATORY WEAR ALONG RAILROAD TRACKS

[75] Inventor: Fritz Buhler, Ecublens, Switzerland

[73] Assignee: Les Fils d'Auguste Scheuchzer S.A., Switzerland

[21] Appl. No.: 678,666

[22] Filed: Apr. 20, 1976

[30] Foreign Application Priority Data

Apr. 23, 1975 Switzerland .................. 5186/75

[51] Int. Cl.² .............................................. B61K 9/08
[52] U.S. Cl. ........................................ 73/146; 33/144
[58] Field of Search ............................ 73/146; 33/144

[56] References Cited

U.S. PATENT DOCUMENTS

| | | | |
|---|---|---|---|
| 3,056,209 | 10/1962 | Oliver .................................. | 73/146 |
| 3,882,607 | 5/1975 | Plasser et al. ......................... | 33/144 |

Primary Examiner—Donald O. Woodiel
Attorney, Agent, or Firm—Robert E. Burns; Emmanuel J. Lobato; Bruce L. Adams

[57] ABSTRACT

To measure undulatory wear of the rails, a carriage moving along a railroad track has three measuring bases formed by girders each supported on two rollers and each having a rail sensor providing a measurement of deformation of the rail intermediate the support rollers defining the respective measuring base. The measuring bases have different lengths to provide measurements of the amplitude of undulations of given wavelength values. The length of each successively shorter measuring base is related to the length(s) of the longer one(s) to include amplitude measurements for wavelength values not provided by the longer measuring base(s).

13 Claims, 11 Drawing Figures

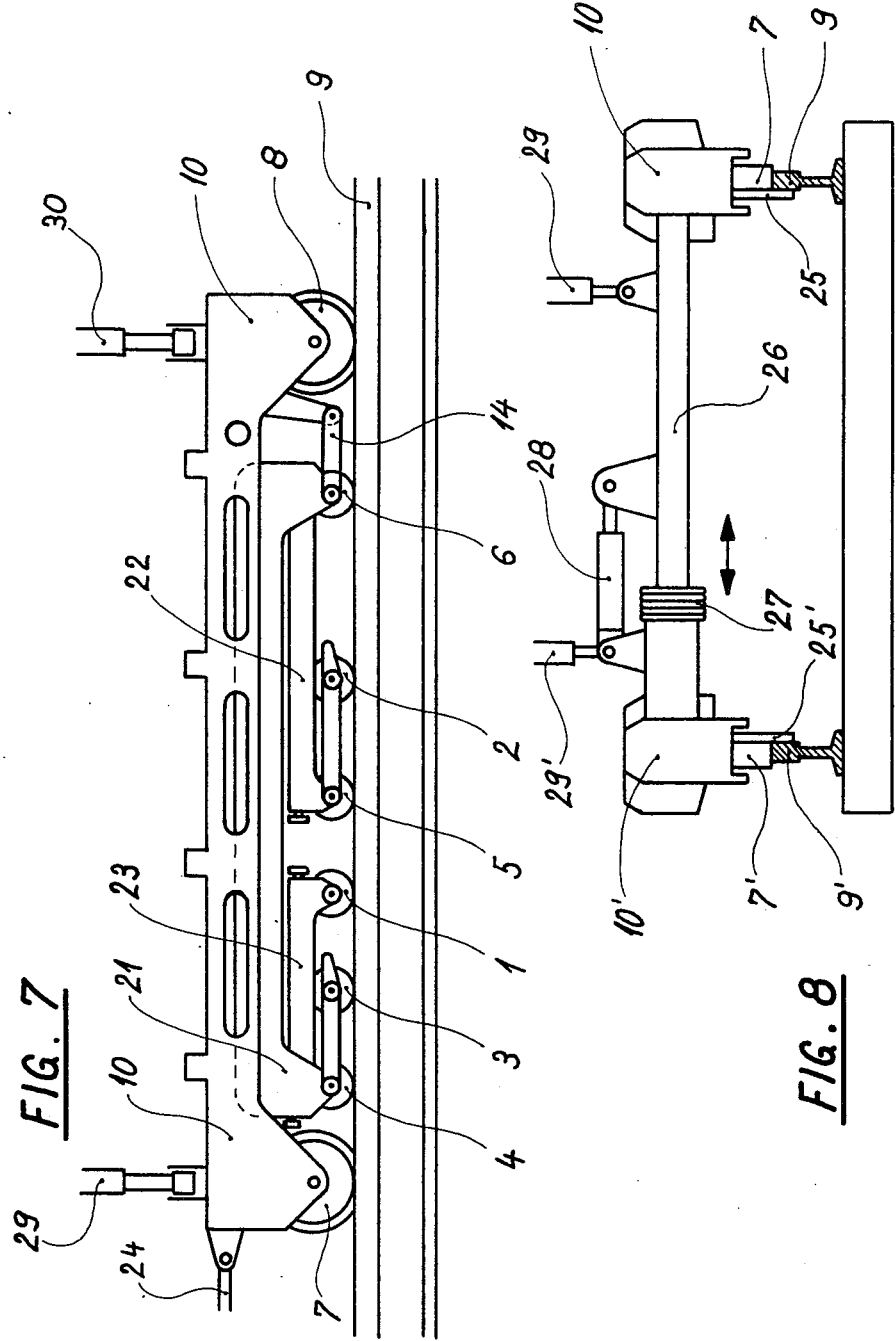

MEASUREMENT OF UNDULATORY WEAR ALONG RAILROAD TRACKS

The invention relates to the measurement of undulatory wear along the rails of railroad tracks.

It is well known that the rails of railroad tracks are worn and deform not in a uniform manner, but with undulations. The wavelengths of these undulations depend on the mechanical characteristics of the trains, the speed of the trains and the elasticity of the rails. As soon as an undulatory deformation begins, its amplitude increases rapidly due to resonance phenomena and this creates dammage to the rails and the rolling stock and discomfort to passengers. As the speeds of trains increases, this problem is becoming ever-increasingly serious.

Maintenance of railroad tracks thus includes, in addition to levelling operations involving lifting collapsed points of the tracks by tamping the cross-ties, grinding the undulations worn in the rails.

To carry out grinding, it is of course necessary to previously control the state of the track to detect the presence of possible undulations and measure their amplitude, and to repeat this operation during and after grinding to verify the quality of grinding and to avoid unnecessary grinding.

The wavelengths of the undulations of worn rails are between about 30 and 1,000 mm. However, several waves of different lengths may be superimposed along a section of the track; this complicates detection and measurement of the amplitudes which are of the order of a fraction of a millimeter.

Various methods of controlling the state of railroad tracks are known, using specially equipped cars. The known methods are all based on the principle of measuring deformation of the track in relation to a measuring base which rests on axles of the car. It is clear that as this measuring base itself bears on the undulated rail, the deformation measured will be inaccurate whatever be the chosen length of the measuring base, and the inaccuracy will be different according to the wavelengths of the various waves, apart from several specific values of the amplitude of deformation for which the length of the measuring base is a multiple of the wavelength.

With the known methods, it is observed that for certain ratios between the measuring base and the wavelength, the amplitude of deformation is only partially measured, or not at all. Consequently, the measurements may not reveal some undulations of the track.

The invention aims to remedy this disadvantage of the known methods by simultaneously using several measuring bases of different lengths, and each associated with a respective sensor, the lengths of said measuring bases being each chosen to provide measurements corresponding to undulations of given wavelength values, and the length of each successively shorter measuring base being related to the length(s) of the longer one(s) to include measurements of undulations of wavelength values not provided by said longer one(s).

The invention also concerns a device for carrying out this method, and which comprises a unit running along the track, said unit comprising means defining several measuring bases of different lengths and each associated with a respective sensor, the lengths of said measuring bases being each chosen to provide measurements corresponding to undulations of given wavelength values, and the length of each successively shorter measuring base being related to the length(s) of the longer one(s) to include measurements of undulations of wavelength values not provided by said longer one(s).

In the accompanying drawings:

FIG. 1 schematically shows the profile of a worn rail with undulations:

Figure 4:
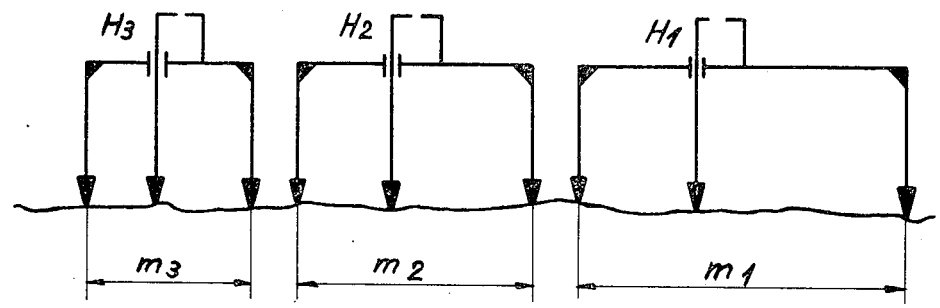
Figure 5:
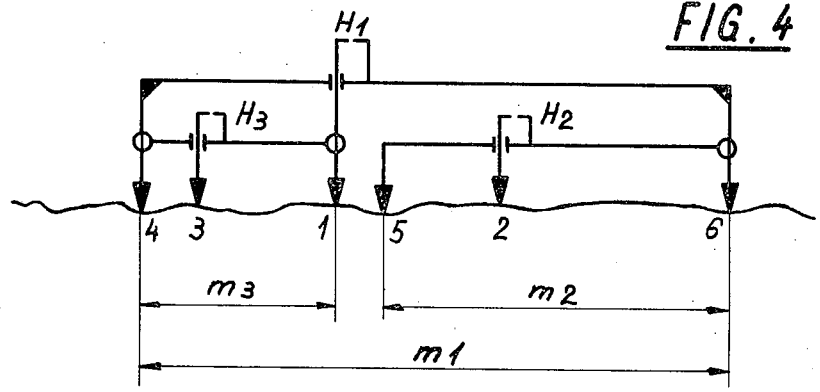
Figure 6:
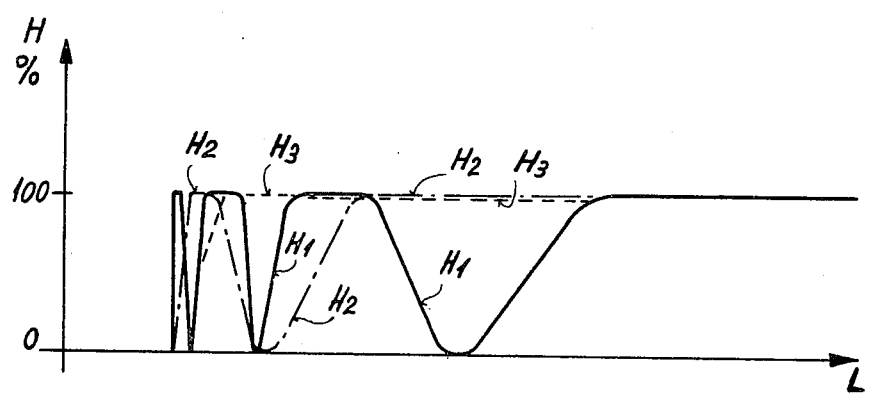

FIG. 4 schematically illustrates the principle of the method according to the invention using three bases;

FIG. 5 schematically shows an application of the method according to the invention, using the same three bases as in FIG. 4 in a special configuration;

FIG. 6 shows the three response curves corresponding to the three measuring bases of the arrangement of FIGS. 4 or 5, superimposed on one another;

FIG. 7 is a schematic elevational view of a measuring carriage embodying a device according to the invention.

Figure 9:
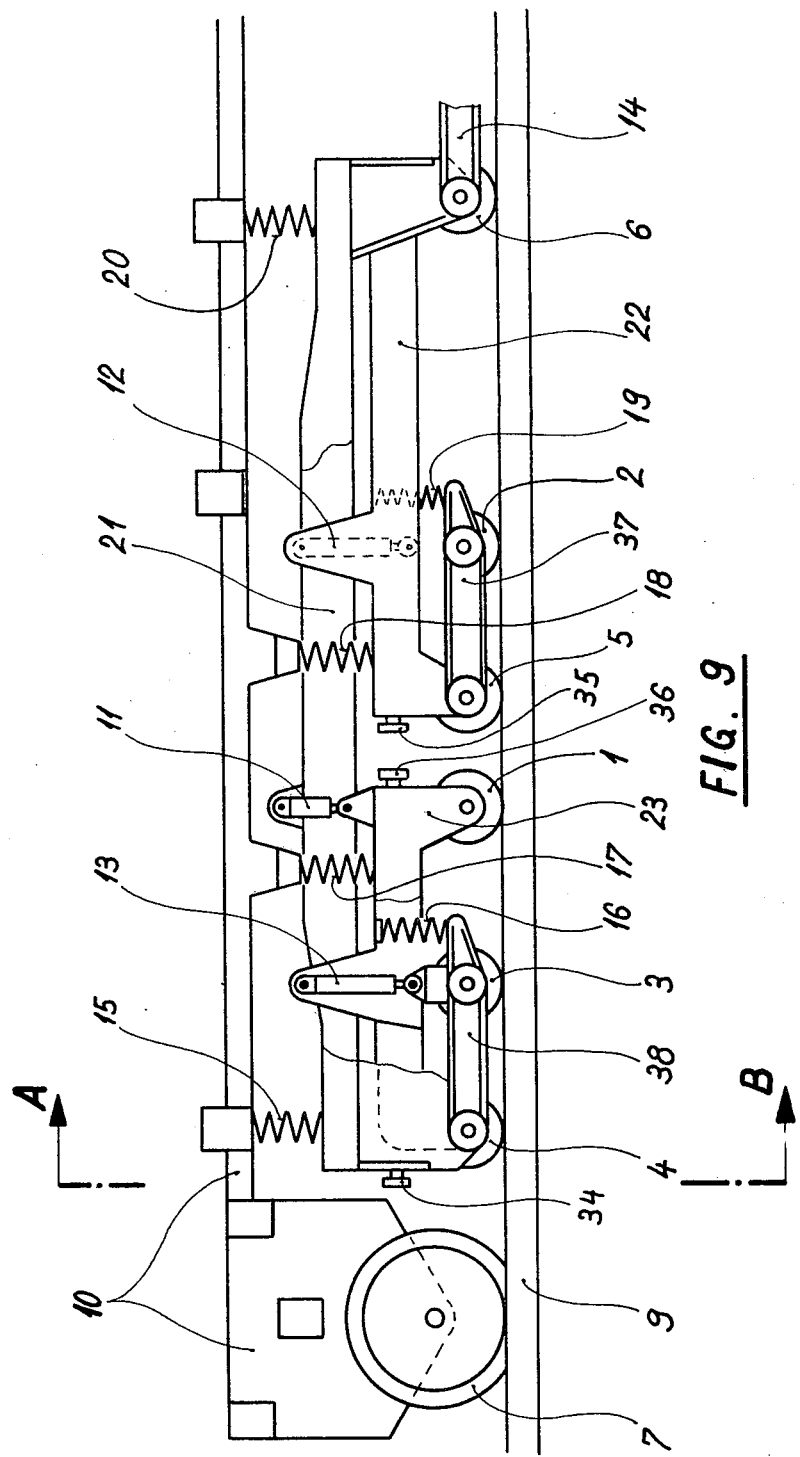
Figures 10, 11:
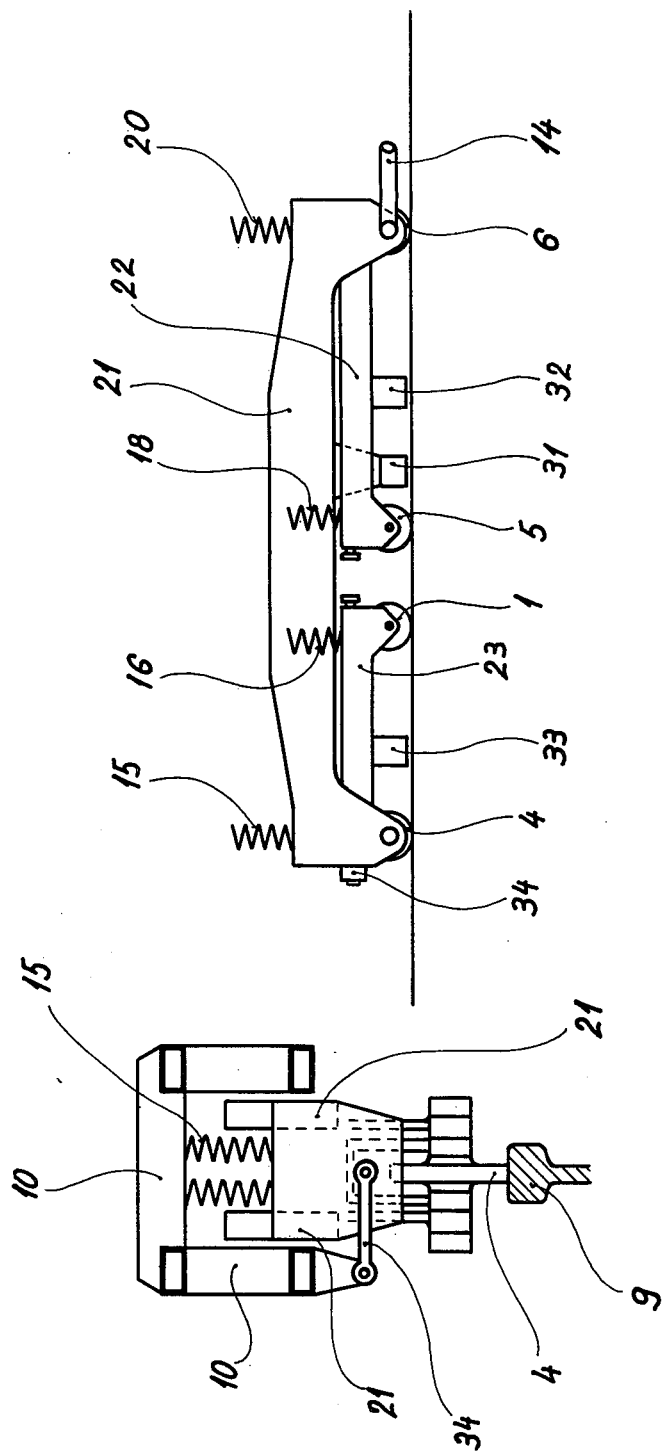

FIG. 8 is an end view of this carriage;

FIG. 9 is an elevational view of part of the same carriage, to a large scale;

FIG. 10 is a cross-section along line A–B of FIG. 9; and

FIG. 11 shows a varied form of carriage in which the sensor rollers are replaced by non-contacting sensors.

Figure 1:
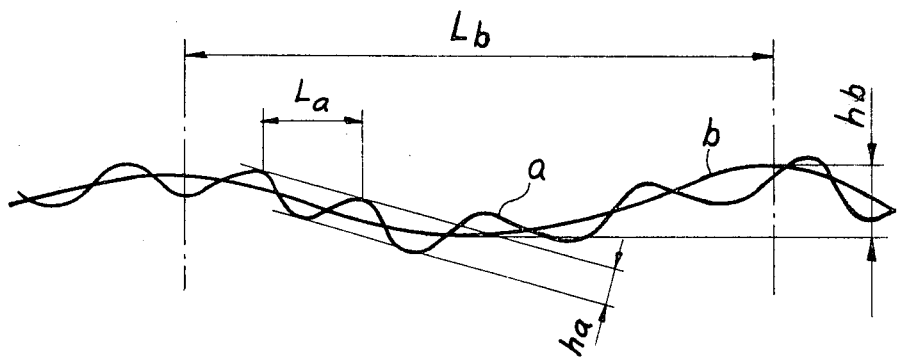

FIG. 1 shows, in a greatly exagerated manner, undulations worn along a part of a rail, comprising undulations $a$ of wavelength $L_a$ and amplitude $h_a$ superimposed on undulations $b$ of wavelength $L_b$ and amplitude $h_b$. To simplify the drawing, only two superimposed waves are shown; in practice there may be numerous superimposed waves of different wavelengths.

The task to be carried out is the detection and measurement of the amplitudes, as $h_a$ and $h_b$.

Figure 2:
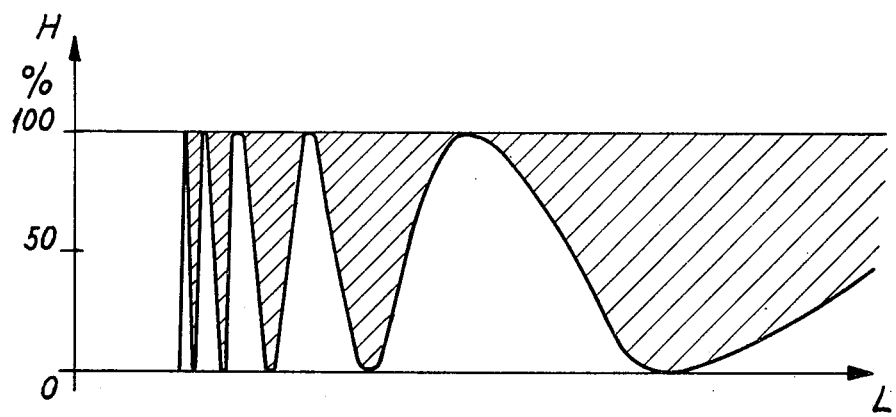
FIG. 2 shows an example of a response curve pertaining to known methods, using a symmetrical arrangement of a feeler and measuring base.
Figure 3:
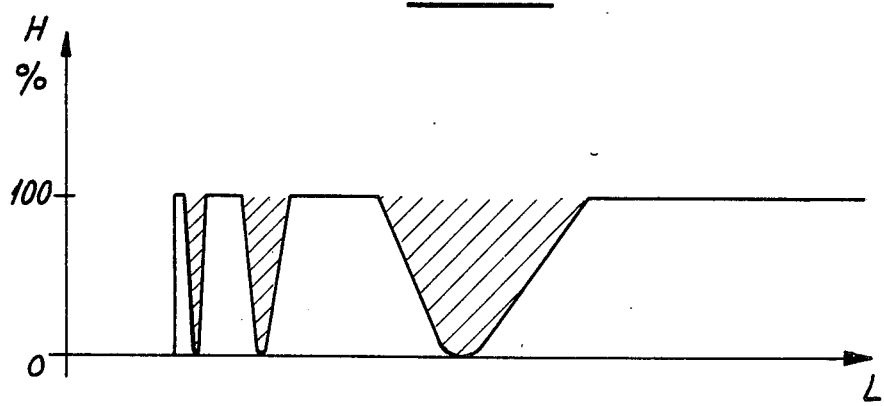
FIG. 3 shows an example of a response curve pertaining to known methods, using an assymetric arrangement of a feeler and measuring base for wavelengths less than or approximately equal to the base length.

Using only a single measuring base, as in prior art methods, the response H of the sensors; (i.e., the measured value of the amplitude as a percentage of the real value) as a function of the wavelength L is as shown by FIG. 2 for a symmetrical base and as shown by FIG. 3 for an assymetric base. For certain values of the wavelength, the response H is zero or partial, as indicated by the hatched zones.

FIGS. 4 and 5 illustrate the principle of the method according to the invention. By using three bases $m_1$, $m_2$ and $m_3$ of different lengths each with a respective assymetrically-disposed sensor $H_1$, $H_2$, $H_3$, the response curves shown in FIG. 6 are obtained, referenced $H_1$, $H_2$, $H_3$ according to the respective sensor. Hence, by suitably selecting the lengths of the bases, gaps in the individual measurements are compensated for. The bases may be disposed one after the other, as in FIG. 4, or may be combined in the configuration shown in FIG. 5.

The respective lengths of the different bases for obtaining an optimum result can be calculated from the transfer-function equations, or could be determined graphically or empirically.

FIGS. 7 to 10 show a measuring carriage constructed in the configuration of FIG. 5 and which forms part of a track measuring and/or reconditioning vehicle. The carriage comprises a frame 10 having four supporting wheels 7,7′,8,8′ running on a stretch of rails 9,9′. It is connected to the vehicle by a coupling rod 24 and four jacks 29,29′, 30,30′ which can suspend the carriage for light running and let it down for carrying out measurements. A sliding transverse connection rod 26 actuated by a jack 28 applies flanges 25,25′ of the wheels against the edges of the rails 9,9′ and an electronic control 27 maintains the theoretical separation during passing over points switches. Between the wheel base of the wheels 7,8, on articulated girders 21,22 and 23 forming the respective measuring bases $m_1$, $m_2$, $m_3$ of FIG. 5, are disposed six rollers 1 to 6 corresponding to points 1 to 6 of FIG. 5. Rollers 1,2,3 serve as sensor rollers for the bases $m_1$, $m_2$, $m_3$ respectively, whereas rollers 4, 5 and 6 form supports for the three measuring bases. Roller 1 serves a dual purpose as a sensor roller for girder 21 and a support for girder 23. The girder 21, which supports and guides the girders 22,23, is connected to the carriage by a coupling rod 14 and is guided laterally by a coupling rod 34. The free ends of girders 22 and 23 are laterally guided by rods 35 and 36 (FIG. 9). The sensor rollers 2 and 3 are mounted on girders 37 and 38 pivoted about the axles of the support rollers 5 and 4. Springs 15 to 20 bias the rollers against the corresponding rail. Linear detectors 11,12,13 measure the amplitudes of deformations detected relative to the respective bases $m_1$, $m_2$, $m_3$ and provide electric output signals representing the measured amplitudes.

FIG. 11 shows a varied carriage in which the sensor rollers 2 and 3 and their detectors 12,13 are replaced by contactless sensors 32, 33 which may be inductive, capacitative, high-frequency, or equivalent. Likewise the detector 11 is replaced by a contactless sensor 31 fixed to girder 21.

An advantage of contactless sensors is the absence of inertia, which enables the detection of undulations of short wavelength at high speeds of the measuring vehicle.

The separate measurements obtained by the three sensors for each rail may all be simultaneously recorded, for example on six tracks of a magnetic tape. Such a magnetic tape could then be analysed by a computer providing a digital read-out indicating the quality of the rail surfaces.

Alternatively, electric signals representing the simultaneous measurements of all the sensors may be compared, and whichever of the measurements instantaneously has the greatest value is recorded. Thus, for each portion of a rail a record is made of the greatest amplitude measured by any one of the three sensors.

As an alternative to magnetic recording, the sensor measurements can be graphically recorded.

What is claimed is:

1. In a method of measuring undulatory wear of a rail of a railroad track comprising moving along the track a unit including a rail sensor sensitive to deformations in relation to a given measuring base within which said sensor is disposed, the improvement comprising simultaneously using several measuring bases of different lengths, and a plurality of sensors each disposed within a respective one of said bases, the lengths of said measuring bases being each chosen to provide measurements corresponding to undulations of given wavelength values, and the length of each successively shorter measuring base being related to the length(s) of the longer one(s) to include measurements of undulations of wavelength values not provided by said longer one(s).

2. A method according to claim 1, further comprising simultaneously recording the separate measurement of all of the sensors of said measuring bases.

3. A method according to claim 1, further comprising comparing the simultaneous measurements of all of the sensors of said measuring bases, and recording whichever of said measurements instantaneously has the greatest value.

4. A method according to claim 1, further comprising graphically recording the measurements of the sensors of said measuring bases.

5. A method according to claim 1, further comprising magnetically recording the measurements of the sensors of said measuring bases.

6. In a device for measuring undulatory wear of a rail of a railroad track, comprising a unit movable long the track wherein said unit includes means defining a given measuring base and a rail sensor sensitive to deformations in relation to said measuring base within which said sensor is disposed, the improvement wherein said unit includes means defining several measuring bases of different lengths and a plurality of sensors each disposed within a respective one of said bases, the lengths of said measuring bases being each chosen to provide measurements corresponding to undulations of given wavelength values, and the length of each successively shorter measuring base being related to the length(s) of the longer one(s) to include measurements of undulations of wavelength values not provided by said longer one(s).

7. A device according to claim 6, in which said means defining each measuring base comprises a girder, and first and second rollers running along the rail supporting the girder, each girder being associated with a rail sensor intermediate said first and second rollers.

8. A device according to claim 7, in which each rail sensor comprises a third roller movably mounted relative to the respective girder.

9. A device according to claim 7, in which each rail sensor comprises detection means supported by the respective girder out of contact with the rail.

10. A device according to claim 6, comprising first, second and third measuring bases of successively decreasing length, said second and third measuring bases being disposed within said first measuring base.

11. A device according to claim 10, comprising first, second and third girders defining said first, second and third measuring bases, a respective pair of rollers supporting each one of said girders and running along the rail, and supporting rollers connecting said second and third girders to opposite ends of the first girder.

12. A device according to claim 11, in which the rail sensors of said second and third girders each comprise a third roller movably mounted relative to the respective girder, and the rail sensor of the first girder comprises an indenpendent supporting roller of one of the second and third girders.

13. A device according to claim 11, in which each rail sensor comprises detection means supported by the respective girder out of contact with the rail.

* * * * *